June 8, 1926.                                                   1,587,543
T. MIDGLEY ET AL
TREATMENT OF RUBBER ARTICLES
Filed Sept. 24, 1921
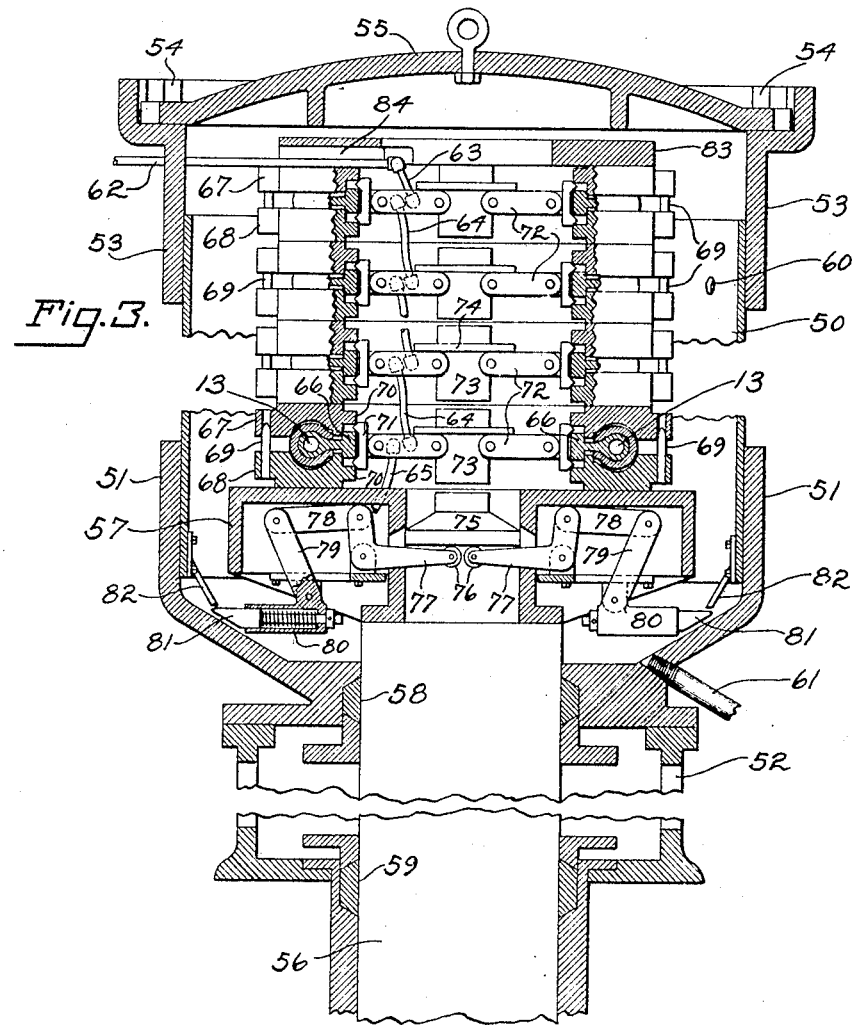
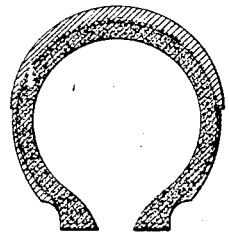
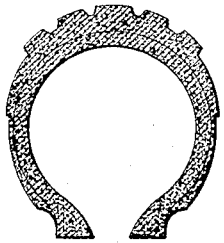
INVENTOR
THOMAS MIDGLEY
RALPH B. NAYLOR
BY
Franklin G. Neal
ATTORNEY Patented June 8, 1926.

1,587,543

UNITED STATES PATENT OFFICE.

THOMAS MIDGLEY, OF HAMPDEN, AND RALPH B. NAYLOR, OF SPRINGFIELD, MASSACHUSETTS, ASSIGNORS TO THE FISK RUBBER COMPANY, OF CHICOPEE FALLS, MASSACHUSETTS, A CORPORATION OF MASSACHUSETTS.

TREATMENT OF RUBBER ARTICLES.

Application filed September 24, 1921. Serial No. 503,020.

This invention relates to improvements in methods of vulcanizing pneumatic tire casings. The present invention embodies specific features of a broader invention claimed in our Patent No. 1,394,928, granted October 25, 1921. This application is for the purpose of covering a species, the genus and additional species of which, as well as the present species, have been fully disclosed in such patent.

The new method is carried out by applying heat to the inside of a tire casing while leaving the outside of the casing exposed, in other words while the outside of the casing is not confined by molds but on the contrary is exposed to an unheated fluid. The latter may in some cases be under pressure as unheated compressed air. This fluid pressure will prevent the blowing due to entrapped gases of the rubber covering of the casing which is on the outside while the heat is being applied to the casing through the carcass or fabric portion which is on the inside of the casing.

For a more complete disclosure of the invention reference is made to the accompanying drawings in which:—

Fig. 1 is a sectional view of a tire casing in which the stippled portion represents in a general way the approximate degree of partial vulcanization which may be given to the tire casing while the heat is applied to it from the inside.

Fig. 2 is a like view but showing by the stippling how the tire may be completely vulcanized after the molds have been closed on the covering rubber and heat applied through them to the tire casing.

Fig. 3 is a sectional and detail view of a vulcanizing pot in which this particular species of invention can be carried out to advantage.

To carry out the invention a completely built but unvulcanized pneumatic tire casing may be mounted on a core. The heated core applies heat locally to the inside of the tire casing. In this manner the heat may be applied to the inside of the casing while the outside is exposed to the relatively cooler atmospheric fluid at normal or higher pressure. It is convenient to apply the heat through the core but it can of course be applied in other ways, for example in any of the ways as by heated fluid, it being known in the art how fluids may be confined to the inside of the casing.

For a better understanding I will describe how the improved method may be carried out in connection with the apparatus shown in Fig. 3.

In this figure is shown a heater fitted up with means for maintaining separation of the mold members as long as desired or until the regional or partial vulcanization through the carcass as indicated in Fig. 1 is completed.

The heater comprises a cylinder 50 mounted on a casting 51, supported on a foundation 52. To cylinder 50 is secured a head 53 with inwardly projecting lugs 54 under which a removable cover 55 is held. Movable through the foundation and the casting 51 is a hydraulic plunger 56, under which water pressure is introduced by any suitable means. A table 57 is carried on the flanged top of plunger 56. By controlling the water pressure under the plunger the table may be raised and lowered, and a pile of molds and tires placed on the table can be pressed with any desired force against the cover 55. Leakage of water past the plunger 56 is prevented by stuffing boxes 58 and 59. Provision is made, as by an inlet 60, and outlet 61, for furnishing compressed air, steam, or water to the inside of the heater. All the above parts are old and well known in the art and need not be described further.

The tire casings are mounted on internally chambered ring cores. These cores may be the ones on which the casings were constructed. Hollow cores such as core 13 if the tire casing is of the type having inextensible beads, may be formed of a plurality of sections held together by suitable means in a well known manner. Provision is made for the circulation of steam through the several hollow sections by any suitable steam connections. If the tire casings are of the clincher or extensible type the hollow cores may be integral having a partition wall between adjacent inlet and outlet passages for steam or heating fluid to the interior.

Connection is made to the hollow interior of the cores through flexible pipes as by an inlet pipe 62 connected to the top core by a short pipe 63. The chambers of the several cores are joined by flexible tubes 64, and the bottom core is connected to an outlet by a flexible tube 65. In this manner the connections of inlet pipe and outlet pipe to each core provides for a circulation in the cores. By this circulation the cores may be maintained at a desired temperature so as to apply heat to the interior of the tire casing while the outside of the casing is exposed.

Surrounding each core is a split mold composed of an upper section 67 and a lower section 68. These sections are guided relative to each other by dowels 69 fastened in the lower section and running in holes in the upper section. Each section has an inwardly projecting annular lug 70 by which the sections of each mold are held apart as will be described. The forming faces of the mold sections are shaped to give the desired form to the tire and may be provided with the usual raised and depressed portions to give a design as indicated in Fig. 2 although such pattern has not been shown in Fig. 3.

Fitting between flanges 66 of the cores and lugs 70 of the molds are double wedges 71, which when held outwardly will hold the mold sections apart a distance out of contact with the casing according to the design of the wedges 71, and will position the core midway between them. These wedges form part of what may be termed a toggle unit. One toggle unit is provided for each of the split molds, and preferably there are three wedges, equally spaced circumferentially, to each unit. Each wedge is pivoted by a pin to a pair of arms 72 which straddle an inwardly extending lug on the wedge. The other ends of these arms are pinned to a lug on head 73. Head 73 is provided with a flange 74, which serves as an abutment to prevent the arms 72 swinging upwardly beyond the position shown. In this position the arms are slightly higher than the line of their pivots on head 73, and hence, once they have been placed in this position, the pressure exerted by the mold sections on the wedges will prevent the arms swinging downwardly past the line of their pivots and the breaking of the toggle thus formed.

The thickness of head 73 is preferably such that when the molds and toggle units are stacked on top of one another a slight space will be left between adjacent heads, as shown in the drawing. This is to allow the toggles to be broken one at a time by the mechanism about to be described. Running in a bearing in table 57 is a block 75, whose bottom rests upon rollers 76 at the ends of bell-cranks 77, and whose top is arranged to abut against the lowest head 73. The other end of each bell-crank 77 is connected by a link 78 to another bell-crank 79 pivoted to the table 57. The lower end of bell-crank 79 is formed into a tubular sleeve 80 in which runs a spring pressed pawl 81. The outer end of this pawl is adapted to engage a depending lug 82 attached to casting 51. When the parts are in the position shown in the figure the pile of molds reaches nearly to the cover, and in this type of heater the mold pressure for the final vulcanization is obtained by forcing the pile against the cover by the hydraulic plunger 56. As the plunger is raised, the outer ends of pawls 81 catch under the lugs 82 and cause the inner ends of bell-cranks 77 to be raised, thus raising the block 75. As this block abuts against the lowest head 73 the latter is raised, swinging toggle arms 72 past their dead center. When the toggle is thus broken the weight of the molds piled on top of the bottom section of the lowest one will force the wedges of that one inwardly, thus forcing the lowest head 73 upwardly until it impinges against the second from the bottom head. In this manner the breaking of the toggles proceeds successively from bottom to top of the pile. If desired the space between heads 73 may be decreased by thickening the heads enough to contact so that all the toggles will be broken substantially simultaneously by the raising of block 75, but the present construction is preferable in this instance where the molds are held out of contact with the casings, as it avoids heavy shock due to the simultaneous collapse of all the molds, which are very heavy. It will be noted that the molds may be collapsed and the vulcanizing pressure applied without removing the cover from the heater. This both saves time and avoids cooling of the molds and casings with consequent loss of heat and interruption in the vulcanizing process. Instead of using the mold manipulating means described the invention could be carried out by opening the heater and applying the molds to the casings by hand or other ways. The apparatus described is for convenience.

A plate 83 with a cutaway portion 84 is placed on the top of the pile of molds to allow pressure to be exerted by the pile against the cover 55 without injuring the pipe 62.

On the descent of the plunger 56 pawls 81 will slip by lugs 82 on account of their spring mounting. If the plunger is raised with no molds upon it or with a pile not reaching to the top of the heater the pawls will be engaged by the lug as described, and will break the toggles of whatever units are supported by the plunger, but will then tilt past the lugs and allow the plunger to ascend freely.

In carrying out our invention with this form of apparatus the cover 55 is removed, the table 57 brought near the top of the heater, and the lower half of the bottom mold laid on. A core, with a tire casing mounted thereon, is taken and a toggle unit sprung into position with the inner wedge surfaces engaging flange 66 of the core. This core and toggle unit is then laid on the mold, the lower part of the wedges engaging lugs 70 on the mold, thus securing registration of the core and mold but with the casing out of contact with the mold. The tubes 65 and 64 are connected, and the upper section of the mold laid on, registration being secured by the dowels 69 as well as the action of the wedges which keep the mold out of contact with the casing. Subsequent toggle units, molds, casings, and cores, are laid on in a similar manner and the top core connected with tube 63. The wedges 71 not only serve to keep the mold sections separated, but also to maintain the cores centralized. When all the parts have been positioned the cover is clamped down and heat applied through the pipes to the chambered portions of the ring cores. During this local or regional application of heat to the inside of the pneumatic tire casings the outside of the casings are exposed. This exposure may be to the air at atmospheric pressure and normal temperature. The outside of the casings may be subjected during this part of the process to the action of unheated compresed air to prevent "blowing."

This blowing is likely to occur when the casing has enough rubber covering as in the tread and sidewalls of a large tire to cause any entrapped gases in the rubber to expand. With the heat applied to the inside of the casing while the outside or covering rubber is exposed to an unheated medium the tendency is to keep the covering rubber at a lower temperature than the carcass and thus the tendency for the entrapped gases to expand is lessened. The amount and condition of the rubber under actual manufacturing conditions however varies and for this reason we have described various ways of treating the outside while the heat is being applied to the inside of the casing.

By the methods described it will be noted that a vulcanized bond is made between the carcass and the tread but the rubber of the latter is left, substantially free and unvulcanized so as to flow freely under the mold pressure, giving a particularly advantageous condition of the casing to form the non-skid design on the tread.

In the practice of the particular invention described the principal advantages will be self evident. Instead of using compressed air the molds may be brought together with sufficient contact with the casings to prevent blowing. This may be accomplished by properly designing the holding wedges for such contact. The heads 73 in this instance may be designed to contact one with another so as to cause the simultaneous breaking of the toggle units since there will be no substantial fall of the mold parts.

When it is desired to apply the full pressure of the molds to the tire casings for the final vulcanization it is merely necessary to admit pressure under the hydraulic plunger. The upward motion of this plunger both withdraws the wedges from their operative position and forces the pile of molds against the lower side of the cover as described. The heating of the tire casings is then continued, either by continuing the supply of steam to the interior of the cores, or by admitting steam or heated fluid to the inside of the heater, or by both. In the claims we have defined the invention both intended to be covered in this application, in its broader and in its preferred embodiments.

Having thus described our invention, we claim :—

1. The method of vulcanizing pneumatic tires which comprises applying heat to the inner surface of a tire whose outer surface is exposed, and subjecting the outer surface of the tire to an unheated fluid.

2. The method of vulcanizing pneumatic tires, which comprises applying heat without pressure to the inner surface of a tire whose tread portion is exposed, and subjecting said tread portion to an unheated fluid.

3. The method of vulcanizing pneumatic tires which comprises applying heat through a substantially non-expansible core to the inner surface of a tire whose tread portion is exposed and applying compresed air to said tread portion of the tire.

4. The method of vulcanizing pneumatic tires which comprises applying heat without pressure to the inner surface of a tire whose outer surface is exposed and subjecting the outer surface to a fluid pressure sufficient to prevent the covering rubber from blowing.

5. The method of vulcanizing a tire casing comprising assembling the carcass and tread portions thereof, heating the assembled casing from the inside outwardly until the casing is partially vulcanized, subjecting the outside of the casing to a fluid pressure sufficient to prevent blowing of the tread rubber while the casing is being heated from the inside, and then completing the vulcanization.

6. The method of vulcanizing pneumatic tires which comprises applying heat without pressure to the inner surface of a tire before applying heat or forming pressure to the outer surface of the tire and then applying heat and molding pressure to the outside of the tire.

7. The method of vulcanizing pneumatic tires which comprises applying heat without pressure to the inner surface of a tire until the carcass is partially vulcanized to the covering rubber and then after this condition is established applying heat and forming pressure to the outside of the tire until the covering rubber is vulcanized.

8. The method of vulcanizing pneumatic tires which comprises applying the heat without pressure to the inner surface of a tire while the outer surface is subjected to retaining pressure only and without heat except that conducted from the inside surface until the carcass is partially vulcanized, then subjecting the outer surface to forming pressure and the whole tire to sufficient heat to complete its vulcanization.

9. The method of vulcanizing pneumatic tires which comprises the steps of heating and partially vulcanizing the tire from the inside while preventing the blowing of the rubber by applying pressure to the outer surface of the tire, and then heating the tire from the outer side to further vulcanize it.

10. The method of vulcanizing pneumatic tires which comprises the steps of heating and partially vulcanizing the tire from the inside only while the tread portion is free from mold pressure, and subsequently applying mold pressure to said tread portion.

11. The method of vulcanizing pneumatic tires which comprises introducing a heating fluid into the space within the tire while preventing blowing of the rubber by applying a fluid under pressure to the outer surface of the tire.

12. The method of vulcanizing pneumatic tires which comprises applying heat to the inner surface of a tire whose outer surface is exposed, and applying a cooling fluid to the outer surface of the tire.

13. The method of vulcanizing pneumatic tires which comprises applying heat without pressure to the inner surface of a tire whose tread portion is exposed, and applying a cooling fluid to said tread portion of the tire.

14. The method of vulcanizing pneumatic tires which comprises applying heat without pressure to the inner surface of a tire whose tread portion is exposed, and applying compressed air to said tread portion of the tire.

THOMAS MIDGLEY.
RALPH B. NAYLOR.